US012582510B2

(12) United States Patent　(10) Patent No.: US 12,582,510 B2
Piché et al.　(45) Date of Patent: Mar. 24, 2026

(54) AUTOMATIC GENERATION OF DENTAL RESTORATIONS USING MACHINE LEARNING

(71) Applicant: Intellident Dentaire Inc., Westmount (CA)

(72) Inventors: Nicolas Piché, Montreal (CA); Nathaniel Lasry, Hampstead (CA); Ammar Alsheghri, Montreal (CA); Farida Cheriet, Montreal (CA); Farnoosh Ghadiri, Verdun (CA); François Guibault, Mont-Royal (CA); Golriz Hosseinimanesh, Montreal (CA); Julia Keren, Westmount (CA); Olivier Lessard, Westmount (CA); Ying Zhang, Montreal (CA)

(73) Assignee: Intellident Dentaire Inc., Westmount (CA)

( * ) Notice: Subject to any disclaimer, the term of this patent is extended or adjusted under 35 U.S.C. 154(b) by 419 days.

(21) Appl. No.: 18/017,809

(22) PCT Filed: Jul. 23, 2021

(86) PCT No.: PCT/CA2021/051035
§ 371 (c)(1),
(2) Date: Jan. 24, 2023

(87) PCT Pub. No.: WO2022/016294
PCT Pub. Date: Jan. 27, 2022

(65) Prior Publication Data
US 2023/0277283 A1　Sep. 7, 2023

Related U.S. Application Data

(60) Provisional application No. 63/056,265, filed on Jul. 24, 2020.

(51) Int. Cl.
*A61C 13/00*　(2006.01)
*A61C 5/77*　(2017.01)
(Continued)

(52) U.S. Cl.
CPC ............ *A61C 13/0004* (2013.01); *A61C 5/77* (2017.02); *G06F 30/10* (2020.01); *G06F 30/27* (2020.01)

(58) Field of Classification Search
CPC ....... A61C 13/0004; A61C 5/77; G06F 30/10; G06F 30/27
See application file for complete search history.

(56) References Cited

U.S. PATENT DOCUMENTS 7,084,868 B2 *　8/2006　Farag ...................... G06T 17/00
　　　　　　　　　　　　　345/419
8,126,726 B2 *　2/2012　Matov .................... B33Y 50/00
　　　　　　　　　　　　　702/155
(Continued)

FOREIGN PATENT DOCUMENTS

CA　　　3054100 A1　9/2018

OTHER PUBLICATIONS

EP Extended European Search Report in European Appln. No. 21846793.4, mailed on Jun. 21, 2024, 10 pages.
(Continued)

*Primary Examiner* — Nicholas D Lucchesi
(74) *Attorney, Agent, or Firm* — Carter, DeLuca & Farrel; Vadim Vapnyar

(57)　　　　　ABSTRACT

A method and a system for generating a three-dimensional crown surface for replacing a missing tooth are disclosed. The method comprising: detecting the missing tooth from a digital three-dimensional representation of a mouth using a first artificial intelligence model; and using a second artificial intelligence model, generating a three-dimensional
(Continued)

crown surface for replacing the missing tooth taking into account one or more of a dental preparation, margin line, occlusion, the gap between the preparation and adjacent and opposing teeth.

11 Claims, 11 Drawing Sheets

(51) Int. Cl.
  G06F 30/10 (2020.01)
  G06F 30/27 (2020.01)

(56) References Cited

U.S. PATENT DOCUMENTS

| | | | |
|---|---|---|---|
| 2002/0015934 A1* | 2/2002 | Rubbert | A61C 7/146 |
| | | | 433/29 |
| 2005/0192835 A1* | 9/2005 | Kuo | B33Y 50/00 |
| | | | 705/2 |
| 2017/0340418 A1* | 11/2017 | Raanan | G06V 30/142 |
| 2018/0008213 A1* | 1/2018 | Rubbert | A61C 9/0046 |
| 2018/0028294 A1 | 2/2018 | Azernikov et al. | |
| 2019/0282344 A1 | 9/2019 | Azernikov et al. | |
| 2020/0000562 A1* | 1/2020 | Wey | A61C 9/0046 |

OTHER PUBLICATIONS

PCT International Preliminary Report on Patentability in International Appln. No. PCT/CA2021/051035, dated Jan. 24, 2023. 6 pages.
PCT International Search Report and Written Opinion in International Appln. No. PCT/CA2021/051035, dated Oct. 26, 2021, 10 pages (with English translation).

* cited by examiner

2000

610

810

500

```
                           ┌─────────┐
                           │  Start  │
                           └─────────┘
                                │
      ┌─────────────────────────▼─────────────────────────┐
      │            Receiving a dataset                     │──── 501
      └──────────────────────────┬────────────────────────┘
                                 │
      ┌ ─ ─ ─ ─ ─ ─ ─ ─ ─ ─ ─ ─ ─▼─ ─ ─ ─ ─ ─ ─ ─ ─ ─ ─ ─┐
      │      Augmenting a plurality of subsets of the dataset│──── 502
      └ ─ ─ ─ ─ ─ ─ ─ ─ ─ ─ ─ ─ ─┬─ ─ ─ ─ ─ ─ ─ ─ ─ ─ ─ ─┘
                                 │
      ┌──────────────────────────▼────────────────────────┐
      │  Training an artificial intelligence (AI) model on │──── 503
      │        data points of a training set               │
      │        ┌───────────────────────────────┐           │
      │        │      Generate a crown         │           │
      │        └───────────────────────────────┘           │
      └──────────────────────────┬────────────────────────┘
                                 │
      ┌──────────────────────────▼────────────────────────┐
      │ Obtaining predicted crowns for a plurality of data │──── 504
      │   points of a test set by applying the (AI) model  │
      │        ┌───────────────────────────────┐           │
      │        │   Generate a predicted crown  │           │
      │        └───────────────────────────────┘           │
      └──────────────────────────┬────────────────────────┘
                                 │
      ┌──────────────────────────▼────────────────────────┐
      │          Computing a distance measure              │──── 505
      └──────────────────────────┬────────────────────────┘
                                 │
                          ◇──────▼──────◇
                   ┌──────Are quality metrics satisfied?──── 507
                   │      ◇─────┬───────◇           Yes
                   │          No│  507B
                   │      ◇─────▼───────◇
                   └──────Have exit parameters been reached?──── 510
                                 │
                           ┌─────▼─────┐
                           │  Finish   │
                           └───────────┘
```

Yes

AUTOMATIC GENERATION OF DENTAL RESTORATIONS USING MACHINE LEARNING

CROSS-REFERENCE TO RELATED APPLICATIONS

This application is a National Stage application under 35 U.S.C. § 371 of International Application No. PCT/CA2021/051035, filed on Jul. 23, 2021, claims the benefit of priority of U.S. Application No. 63/056,265, filed on Jul. 24, 2020, the entirety of both of which are incorporated herein by reference.

TECHNICAL FIELD

This invention relates to the generation of dental reconstructions. More specifically, this invention relates to dental reconstructions generated using machine learning algorithms.

BACKGROUND

Dental offices are faced with hundreds of thousands of dental reconstructions per year. Each dental reconstruction typically requires a dental professional to manually design and input the characteristics of the replacement tooth to be produced. To model and produce tooth restorations (i.e. dental crowns), current clinical practice requires dentists to prepare the patient to receive a crown by removing decayed tooth portions and yielding a tooth preparation on which the crown will be installed. The dentist then acquires analog dental impressions that are shipped to a laboratory where a dental crown can be manufactured using either a manual or a digital process. Crowns manufactured manually typically require an analog mold of a prepared tooth and the teeth that surround it. Then, another kind of mold can be mixed and poured onto the first impression. For porcelain crowns, a liquid-like material is used, cured at high temperatures and hardened over a sizable amount of time. Once cooled, the mold is broken, and the crown is removed. In contrast, some laboratories use digital means to produce crowns. Dental impression either arrives from the dentist in digital form or are digitalized by the dental laboratory. Digital impressions are interactively analyzed and processed by technicians through specialized CAD/CAM software, allowing the manual design of a personalized replacement tooth for each cavity in the scanned arch. Replacement teeth are then produced using numerically controlled milling and 3D printing. This digitalized process still requires a sizable amount of manual design for each tooth being reconstructed and constitutes an important temporal bottleneck. The design of a single tooth can require between 30-60 minutes for a highly skilled technician. Being a manual process, repeatability and quality of tooth design are highly dependent on the operator, and difficult to quantify objectively. CAD/CAM technologies, introduced early in the present decade, have significantly accelerated the preparation of dental restorations. CAD/CAM software have developed enough to perform tasks such as teeth segmentation and occlusion prediction. Occlusion is a key parameter in the design of crowns, as replacement teeth must not interpenetrate or interfere with antagonist teeth.

There is thus a need for a new approach to automatically and efficiently design replacement teeth that will reduce the time necessary to model a personalized tooth and increase the reproducibility of the modelling process.

SUMMARY

One general aspect of the invention includes a method for generating a three-dimensional crown surface for replacing a missing tooth. The method includes, using an artificial intelligence model, detecting the missing tooth from a digital three-dimensional representation of a mouth, and generating a three-dimensional crown surface for replacing the missing tooth taking into account one or more of a dental preparation, margin line, occlusion, the gap between the preparation and adjacent and opposing teeth.

Other embodiments of this aspect include corresponding computer systems, apparatus, and computer programs recorded on one or more computer storage devices, each configured to perform the actions of the method.

Implementations may include one or more of the following features. Training an artificial intelligence model for generating a three-dimensional crown surface according to a method that includes: receiving a dataset comprising digital three-dimensional representations of mouths in which a tooth is missing and is partially replaced with a dental preparation. The method repeats for each digital three-dimensional representation of a mouth of the dataset: selecting a tooth model of the missing tooth; morphing the tooth model into a crown shape taking into account the gap between the dental preparation and adjacent and opposing teeth; and generating a crown from the crown shape of the tooth model taking into account occlusion of the tooth; until quality metrics are satisfied and exit parameters are reached.

In one implementation, the model of the missing tooth is selected from a teeth atlas.

In one implementation, the distance measure is considered satisfying when the predicted crown is visibly indistinguishable from the original tooth.

In one implementation, the tooth preparations are detected using an artificial intelligence model. The artificial intelligence model for detecting tooth generations is trained on a dataset comprising digital three-dimensional representations of mouths in which a tooth is missing and is partially replaced with a tooth preparation. The training method repeats for each digital three-dimensional representation of a mouth of the dataset: labelling each tooth of the three-dimensional representation of the mouth; and detecting teeth preparations; until quality metrics are satisfied and exit parameters are reached.

In one implementation, labeling each tooth of the three-dimensional representation of the mouth is performed taking into account geometric characteristics of teeth bones such as a gap volume surrounding each tooth bone, occlusion, and asperities.

Implementations of the described techniques may include hardware or computer software on a computer-accessible medium.

One general aspect includes a method for training an artificial intelligence model for generating dental preparations. The method includes receiving a dataset comprising digital three-dimensional representations of mouths in which a tooth is missing and is partially replaced with a dental preparation. The method also repeats for each digital three-dimensional representation of a mouth of the dataset: positioning one or more boundaries on one more teeth; for each boundary, removing a corresponding tooth; and replacing the corresponding tooth with a new dental preparation.

The method also includes until quality metrics are satisfied and exit parameters are reached;

In one implementation, the boundary is a margin line.

In one implementation, the new dental preparation is chosen from an atlas of existing dental preparations.

Other embodiments of this aspect include corresponding computer systems, apparatus, and computer programs recorded on one or more computer storage devices, each configured to perform the actions of the methods.

Another general aspect includes a crown generation system configured for generating a three-dimensional crown surface for replacing a missing tooth using an artificial intelligence model. The crown generation system also includes a storage module for storing digital three-dimensional representation of mouths; a processor module having an artificial intelligence model configured to: detect the missing tooth for each digital three-dimensional representation of a mouth; and generate a three-dimensional crown surface for replacing the missing teeth taking into account one or more of a dental preparation, margin line, occlusion, the gap between the preparation and adjacent and opposing teeth. The system also includes a memory module for storing the generated three-dimensional crown surface.

BRIEF DESCRIPTION OF THE DRAWINGS

Further features and exemplary advantages of the present invention will become apparent from the following detailed description, taken in conjunction with the appended drawings, in which:

FIGS. 9A and 9B represent a flow chart of an exemplary method for producing an AI model for generating dental crowns in accordance with the teachings of a fourth set of embodiments of the present invention;

DETAILED DESCRIPTION

Dental offices are faced with hundreds of thousands of dental reconstructions per year. Each dental reconstruction typically requires a dental professional to manually design and input the characteristics of the replacement tooth to be manufactured. Consequently, this time-consuming process is difficult to reproduce between professionals and hence leads to great variability in quality. The present invention provides an improved alternative to optimize reproducibility, quality, and time-consumption during the design of dental reconstructions by asking dental professionals to modify a previously designed replacement tooth by an artificial intelligence AI algorithm rather than designing a replacement tooth from scratch.

Figure 1A:
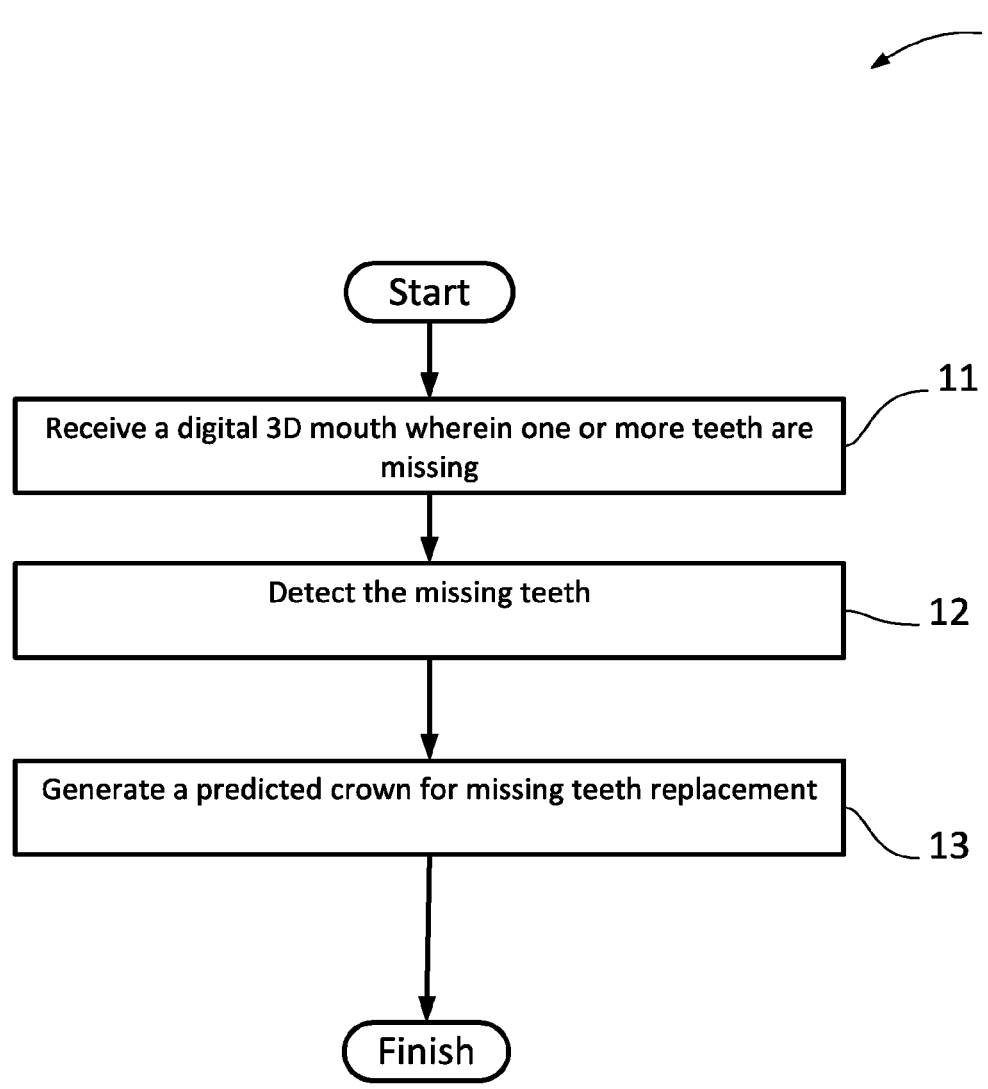
FIG. 1A is a flow chart of an exemplary method for crown generation in accordance with the teachings of the present invention.

Embodiments of the present invention provide a method to train Neural Networks (NN) to generate or deform mesh models to yield a volumetric surface representing the tooth to be reconstructed in its spatial context. FIG. 1A shows a simplified method 10 for generating a crown for of a patient's teeth replacement using AI models. The method 10 starts by receiving 11 a digital 3D representation of a mouth wherein one or more teeth are missing. The AI model detects the missing tooth (e.g., tooth 12) and generates 13 a predicted crown for replacement of the missing tooth.

Figure 1B:
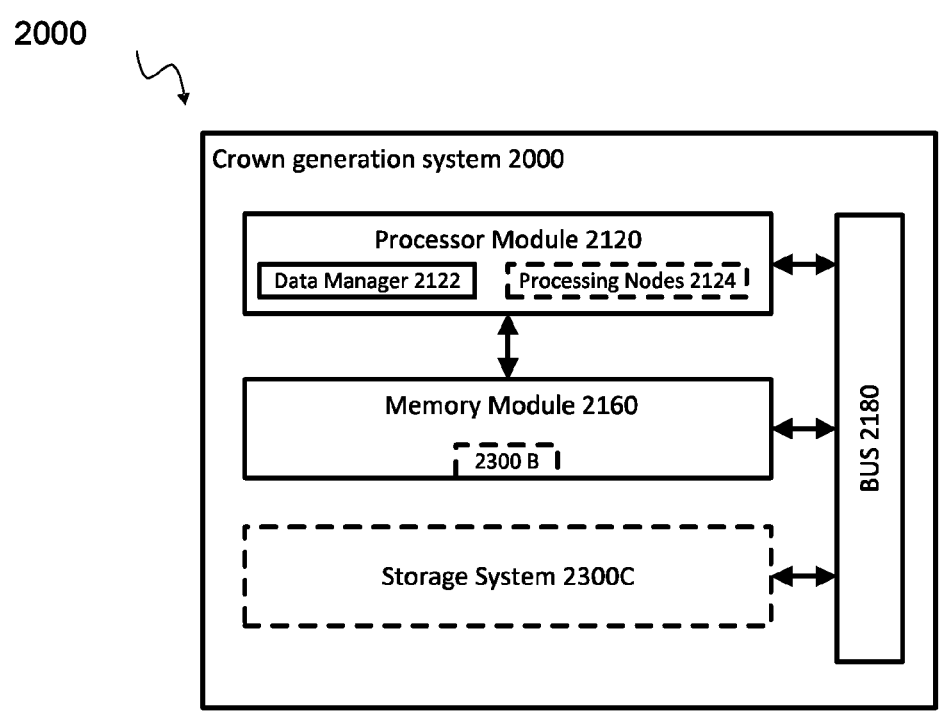
FIG. 1B is a logical modular representation of an exemplary crown generation system in accordance with the teachings of the present invention.

FIG. 1B shows a logical modular representation of an exemplary system 2000 comprising a crown generation system 2100 for generating a three-dimensional crown surface for replacing a missing tooth. The crown generation system 2100 comprises a memory module 2160 and a processor module 2120. In certain embodiments, the processor module 2120 may comprise a data manager 2122 and/or a plurality of processing nodes 2124 configured to accomplish related functions for the processor module 2120. The system 2000 may also include a storage module 2300. The storage module is used for storing digital three-dimensional representation of mouths. For each digital three-dimensional representation of a mouth, the processor module is configured to detect the missing tooth and generate a three-dimensional crown surface for replacing the missing teeth. The memory module is for storing the generated three-dimensional crown surface.

To develop a software system based on AI algorithms usable on-site by dental professionals and capable of generating dental crowns in the specific context of a patient's arch, the invention is described along four main embodiments. In a first set of embodiments, a method for training an AI model for segmenting a 3D mouth is provided. The AI model thus produced is able to recognize a plurality of regions of a 3D mouth including a teeth region. The AI model is also able to recognize 32 sections in the teeth region corresponding to the 32 teeth of a mouth. In a second set of embodiments, a method for detecting dental preparations is provided. The method disclosed in the third set of embodiments allows for generating dental preparations. The fourth set of embodiments describes a method for generating crowns for teeth replacement.

To design crowns using Machine learning (ML) algorithms, 3D arch shapes can be encoded into different formats usable by neural networks (NN). For example, in their digital form, dental arches may be represented as dense connected point clouds or meshes. One approach of using meshes in Machine learning (ML) consists of considering the meshes as graphs and developing convolution operators that take graphs as input. Several techniques such as Graph Convolutional Neural Network (Graph-CNN), voxel-based techniques, and/or 3D Modified Fisher Vectors may be used to classify shapes represented as point clouds and meshes using Deep Learning approaches. Operators for unstructured data such as Spline-based Convolutional Neural Network (Spline-based CNN) may also be advantageous for allowing use of the meshes in Machine learning (ML). One technical advantage of the (Spline-based CNN) is that they are formulated in the spatial domain and do not require an input transformer to cope with graphs of different connectivity. Approaches using multi-view methods of images obtained from different point-of-views may be combined to classify 3D meshes.

Embodiments of the present invention provide a method and a system for combining professional dental reconstruction methods with AI algorithms to produce dental reconstructions. One goal is to train an AI algorithm to produce an AI generated dental reconstruction design. In some embodiments, a dental professional has only to modify an AI generated dental reconstruction design rather than designing a replacement tooth from scratch while improving overall quality of AI generated dental reconstruction designs.

During the AI model training process, the learning algorithm is provided with tasks, data points, and their corresponding features. From this information, the AI model computes the parameters that fit best the training dataset. The parameters include weights that may be seen as the strength of the connection between two variables (e.g. two neurons of two subsequent layers). The parameters may also include a bias parameter that measures the expected deviation from the true answer to the task. The learning process refers to finding the optimal parameters that fit the training dataset. This is typically done by minimizing the training error defined as the distance between the predicted answer computed by the AI model and the true answer provided by an agent. The goal of the training process is to find values of parameters that make the prediction of the AI model optimal. The agent is the entity providing the true answers of the training dataset. The agent may be a person, a group of persons, a system or any combination thereof.

A hyperparameter influences the way the learning algorithm providing the AI model works and behaves. The hyperparameters may affect time and memory costs of running the learning algorithm. The hyperparameters may also affect the quality of the AI model given at the end of the training process. The hyperparameters may also affect the ability of the AI model to infer correct results when used on new data points. Examples of hyperparameters include: number of hidden units, learning rate, dropout rate, number of epochs representing the number of cycles through the training dataset, etc. The hyperparameters may be tuned manually or may be tuned automatically, e.g., using tuning libraries.

A part of the training process is testing the AI model on new data points. During the testing phase, the AI model is provided with new data points for which a predicted answer is to be computed. The ability of the AI model to infer correct answers for new data points is called generalization. The performance of the AI model is improved by diminishing the generalization error defined as the expected value of the error on a new data point.

Regularization methods such as Dropout, Monte-Carlo Dropout, Bagging, etc. may be used to diminish the generalization error of the learning algorithm. This may be described as means of diminishing interdependent learning amongst the neurons. In the case of Dropout, this is typically achieved by randomly ignoring a subset of neurons during the training phase of the AI model. The ignored neurons are not considered during one or more particular forward or backward passes.

Data augmentation is a regularization technique used to reduce the generalization error. This is typically achieved by increasing the size of the training set by adding extra copies of the training examples. The added extra copies have been modified with transformations that do not change the original features of the data points. Hence, data augmentation allows for significantly increasing the diversity of data available for training AI models without collecting new data. Data augmentation techniques may include cropping, padding, rotating, zooming, scaling and horizontal flipping. Other transformations such as random perturbation of the colors of an image and/or nonlinear geometric distortions of the input may also be used to augment a dataset.

Other regularization methods such as Dropout are used to avoid overfitting that occurs when the AI model learns the statistical noise in the training data, which results in a high generalization error when the AI model is tested on new data. Dropout has the effect of making the training process noisy, forcing neurons within a layer to take on more or less responsibility for the inputs.

Meta-learning is a technique used to increase the AI model's capacity to generalize its learning to learn new tasks. Meta-learning can be seen as the ability to acquire knowledge versatility. Few shots meta-learning is a type of meta-learning in which deep neural networks (DNN) that can learn from minimalistic datasets are created. A plurality of techniques based on few shots meta-learning such as memory augmented neural networks and one-shot generative models may be used to train AI models. Other types of meta-learning may be focused on learning how to optimize a neural network to better accomplish a task. Such types of meta-learning are known as optimizer meta-learning. Different types of meta-learning may be used to improve the knowledge versatility of the AI models such as metric meta-learning, recurrent model meta-learning, etc.

In accordance with a first set of embodiments, a method for training an AI model for segmenting a 3D mouth is provided. The AI models are the result of applying learning algorithms on a training dataset. The training dataset contains data points for which a segmentation task is completed by a segmentation agent. Examples of data points may include 3D surface meshes of digitalized dental impressions. The 3D surface meshes of digitalized dental impressions can be encoded in STL files. The segmentation tasks allow division of a digital 3D representation of a mouth into a plurality of sections of interest. For example, segmentation tasks may include identifying several regions of the mouth such as teeth, gingiva, teeth gingiva boundary, etc. The AI model is asked to produce predicted segmentations representing answers of the AI model to each segmentation task of a generalization dataset. The generalization dataset contains a distinct subset of data points for which a segmentation task is to be completed by the AI model. A segmentation agent has previously segmented the data points of the generalization dataset. The segmentation agent may, for example, be a dental professional.

Examples of tasks performed include segmentation tasks where the AI model is asked to specify the class to which a data point belongs. In this case, the output of the AI model may be a probability distribution over classes. The predicted segmentation of the AI model may be the class having the highest probability density. The segmentation task may refer additionally to segmenting the mouth into 32 sections representing the 32 teeth of a mouth. In a preferred embodiment, the AI model is asked to divide the digital 3D representation of a mouth into 3 regions teeth, gingiva, and teeth gingiva boundary and then divide the teeth region into 32 different sections representing to the 32 teeth of a mouth.

Figure 2:
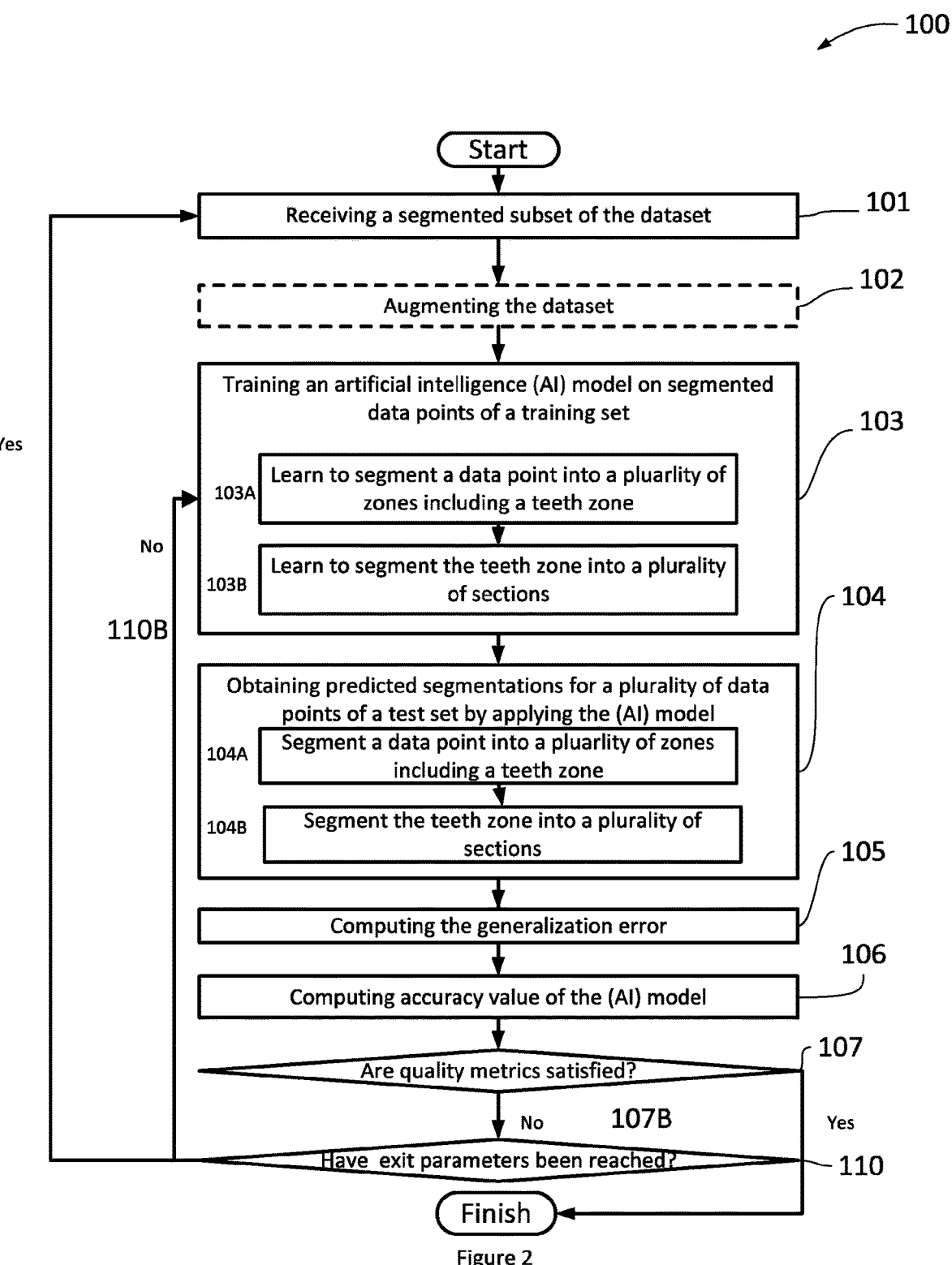
FIG. 2 is a flow chart of an exemplary method for training an AI model for segmenting a digital 3D representation of a mouth in accordance with the teachings of a first set of embodiments of the present invention.

Reference is now made to the drawing in which FIG. 2 shows a flow chart of an exemplary method 100 for training an Artificial Intelligence AI model for segmenting a 3D mouth. The method 100 comprises receiving 101 a segmented subset of a dataset. The segmented subset comprises for each data point, one or more segmentations. The segmented dataset may optionally be augmented 102. During the training, an AI model is trained 103 using a plurality of segmented data points of the dataset. The set of data points used to train the AI model is called the training set. During step 103, the AI model learns 103A to segment the data point into a plurality of regions including a teeth region. The AI model than learns 103B to segment the teeth region into a plurality of sections. The method 100 also includes obtaining 104 predicted segmentations for a plurality of data points of a test set by applying the AI model. During step 104, the AI model is asked to segment 104A the data point into a plurality of regions including a teeth region. The AI model is also asked to segment 104B the teeth region into a plurality of sections. The generalization error is afterwards computed 105. The method 100 additionally computes 106 accuracy value of the AI model. If quality metrics 107 are not satisfied 107B, the method 100 then checks 110 if exit parameters have been reached. In the case where exit parameters have not been reached 1108, the method 100 goes back to step 103. Otherwise, the method 100 goes back to receiving 101 a segmented subset of the dataset. The method 100 is repeated continuously until quality metrics are satisfied.

A labeling agent may be a dental professional for instance. In a preferred set of embodiments, during the validation phase a labeling agent will be able to validate the predicted segmentations. Validation may include removing manually the false positives and/or adding the missed teeth, etc.

The generalization error may be defined for each task. For example, the AI model computes the generalisation error for the segmentation task related to segmenting the tooth region. The generalization error may alternatively be computed for each 3D digital mouth. A skilled person in the art will already recognize that the ways in which the generalization error is defined do not affect the teachings of the present invention.

Quality metrics are defined depending on the segmentation task and present exit conditions of the loop of method 100. Examples of quality metrics include accuracy and error rate. Accuracy is the proportion of data points for which the model produces correct predicted segmentations. Error rate is the proportion of data points for which the model produces incorrect predicted segmentations. Another quality metric may be a generalization error defined as the expected value of the error on a new data point. The generalization error of a machine-learning model is estimated by measuring performance of the model on data points of a test set. A person skilled in the art would already recognize that the generalization error may be high at the beginning of the process and may, overall, diminish as the training of the AI model advances showing slowing of improvement of the AI model. In cases where the quality metric is the generalization error, the quality metrics may refer to an average generalization error between successive iterations. Another way of setting the quality metric is by defining a maximum generalization error that is tolerated in such a way that the AI model will continue training as long as the generalization error is higher than the maximum tolerated value.

In some embodiments, the quality metric may refer to a threshold value of accuracy or to a threshold value of mean accuracy. In other embodiments, the quality metric may be a combination of a plurality of quality metrics. A person skilled in the art would already recognize that the ways of setting the quality metrics do not affect the teachings of the present invention.

Exit parameters may be seen as the number of iterations during which the learning algorithm is allowed to continue training before receiving a new segmented subset. An exit parameter may simply refer to a number of training iterations to be performed on a training set before receiving a new-segmented subset even though quality metrics are not satisfied. Another exit parameter may be the generalization error drop. The generalization error drop may represent the variation of the generalization error between successive iterations. In this way, the AI model continues training as long as the generalization error diminishes by a certain rate (e.g., 0.015).

In some embodiment, the exit parameter may refer to an average accuracy gain of the model over several iterations of the training. In this way, the model will continue training for a certain number of iterations even if the accuracy does not significantly increase at each iteration.

The number of iterations to be performed before stopping the training may depend on the volume of the dataset. A person skilled in the art will recognize that the ways of setting exit parameters do not affect the teachings of the present invention.

The method 100 can, alternatively or in addition, admit different exit conditions. Examples of exit conditions include conditions related to resource consumption associated to the production of the AI model. The resources may be financial resources, time resources or of any other type. In the case of human dental professionals providing the segmentations, the cost associated with each segmentation task is an example of a financial resource. The cost can be direct such as the hourly fee of the dental professional or indirect such as the energy cost of the production of the segmentations. The time required to a human dental professional to segment a subset of the dynamic list is an example of a time resource that is directly related to the production of the AI model. In the case where the dental professional is a system, a typical example of financial resources can be the indirect costs of acquisition and maintenance of the system. A person skilled in the art may already recognize that different quality metrics and exit parameters may be used depending on the tasks the AI model is asked to perform.

Figures 3A, 3B:
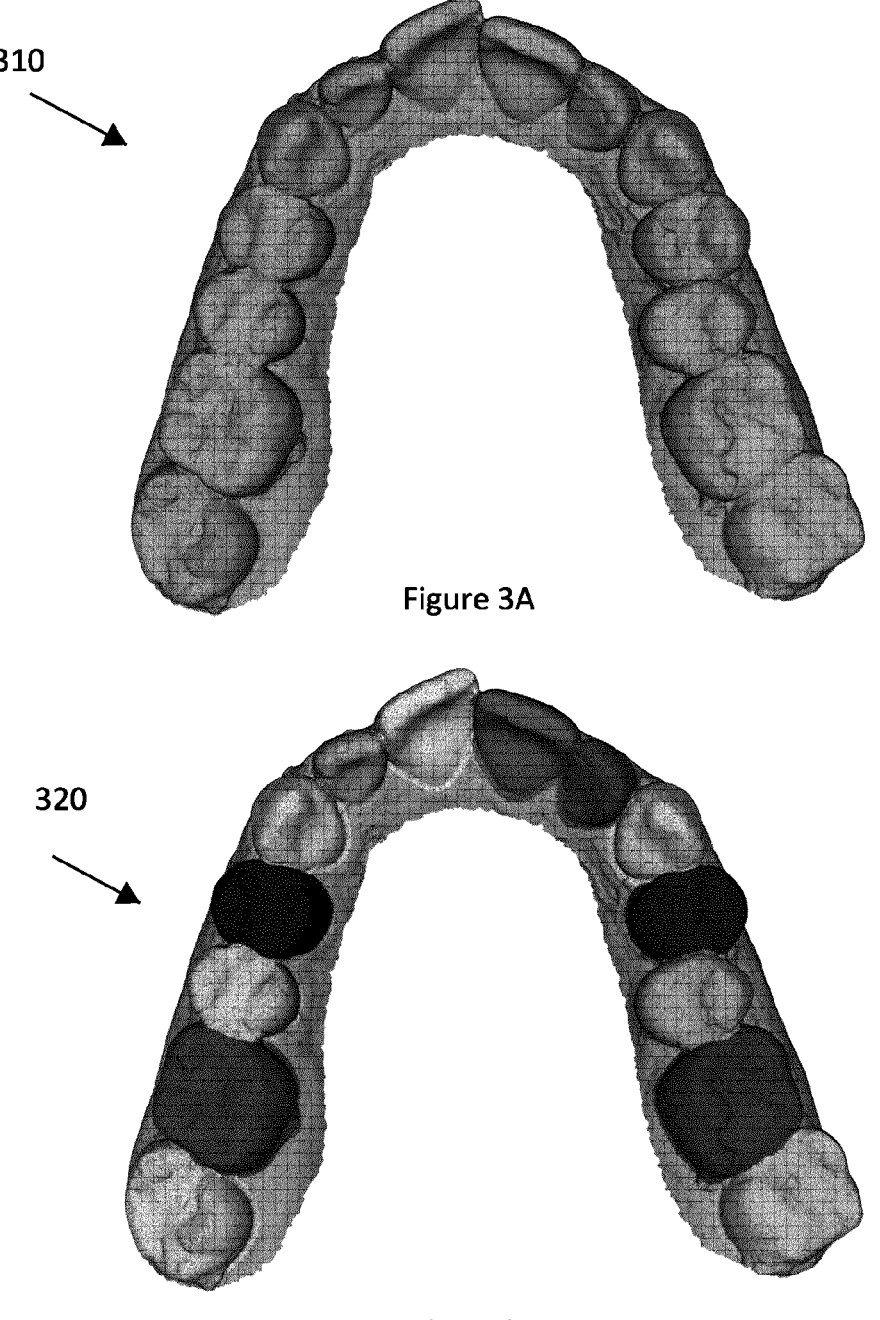
FIGS. 3Aa and 3B, hereinafter referred to concurrently as FIG. 3, a perspective view of an exemplary pre segmented and post segmented upper arch in accordance with the teachings of the present invention.

FIG. 3 shows an exemplary pre segmented 310 and post segmented 320 upper arch in accordance with the teachings of the present invention. The example of FIG. 3 shows that the AI model has recognized teeth, gingiva and the teeth gingiva boundary as only teeth are brought out. In FIG. 3, all teeth have been segmented and each of the 16 teeth of the upper arch is brought-out using a distinct color. In the depicted example, for unavoidable practical reasons, the distinct colors are presented as different shades of gray. At this point, the AI model is able to recognize teeth, gingiva and the teeth gingiva boundary. However, the AI model may not yet be able to distinguish teeth types or teeth names. For example, the AI model may not be able to differentiate the teeth in positions 26 and 17, using ISO notation for tooth identification. In the segmentation example of FIG. 3, the AI model colours each teeth with a different colour without taking into account its position. Teeth recognition based on their geometric characteristics is discussed in the second set of embodiments.

In accordance with the second set of embodiments, a method for producing an AI model to be used for detecting dental preparations is provided. The AI models are the result of applying learning algorithms on a training dataset. The training dataset contains data points for which a segmentation task and a labeling task have been completed. The segmentation task is similar to the segmentation task described in accordance with the first set of embodiments in which the teeth region was segmented without differentiating one teeth type and name from another. The labeling task is related to classification of teeth based on their geometric characteristics, environment, position, etc. In this case, the AI model may identify geometric characteristics of teeth such as the gap volume surrounding each tooth, occlusion, asperities, etc. The AI model may even label the teeth by giving each teeth a name (e.g., 17, 26, 14, etc.). An example of a labeling system that may be used to present the labels is by pairing each colour with exactly one tooth of the arch and pairing each tooth with exactly one colour. For instance, teeth in position 26 may be paired with a brown colour and teeth in position 17 may be paired with pink. A skilled person will already recognize that the ways the labeling is presented do not affect the teachings of the present invention.

The labeler may be a dental professional, a dental student, an intern, etc.

Figure 4:
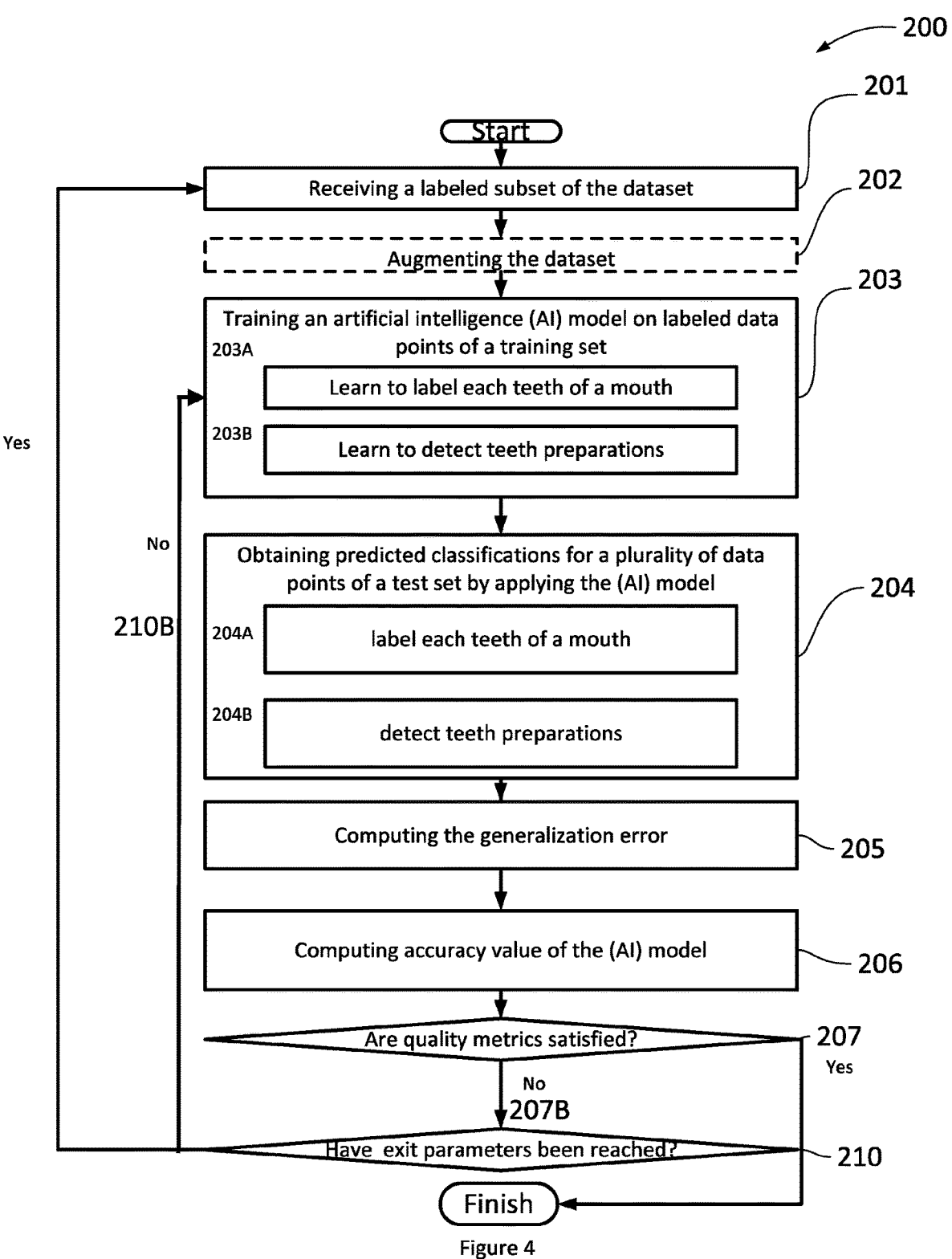
FIG. 4 is a flow chart of an exemplary method for training an AI model for detecting preparations in accordance with the teachings of a second set of embodiments of the present invention.

Reference is now made to the drawing in which FIG. 4 shows a flow chart of an exemplary method 200 for training an Artificial Intelligence AI model for detecting tooth preparations. The method 200 comprises receiving 201 a labeled subset of a dataset. The labeled subset comprises for each data point, one or more labels. The labeled dataset may optionally be augmented 202. An artificial intelligence AI model is trained 203 using a plurality of labeled data points of the dataset. During training 203, the AI model learns 203A to label each tooth of a mouth and to detect 203B teeth preparations. The method 200 also includes obtaining 204 predicted classifications for a plurality of data points of a test set by applying the AI model. At step 204, the AI model is asked to label 204A each tooth of a mouth of a plurality of data points. The AI model is also asked to detect 204B teeth preparations of the data points. The generalization error is afterwards computed 205 for each data point. The method 200 additionally computes 206 accuracy value of the AI model. If quality metrics 207 are not satisfied 207B, the method 200 then checks 210 if exit parameters have been reached. In the case where exit parameters have not been reached 210B, the method 200 goes back to step 203. Otherwise, the method 200 goes back to receiving 201 a labeled subset of the dataset. The method 200 is repeated continuously until quality metrics are satisfied.

During the training, the AI model is asked to specify to which class a tooth of a digital 3D representation of a mouth belongs. The output of the AI model may be a probability distribution over a plurality of classes. Each tooth of the mouth may be considered as a class. Another class may be dental preparations. Yet, another class may be vacant space between teeth and may be used to identify positions where a tooth is missing. The predicted classification of the AI model is the class having the highest probability density. In order to produce a predicted classification, the AI model identifies geometric characteristics of the teeth bone such as the gap volume surrounding each tooth bone, occlusion, asperities, etc. Based on these geometric characteristics of the tooth bone, the model identifies the class to which the tooth belongs. In cases where a tooth is present and the tooth bone geometry at a given location does not correspond to one of the 32 classes representing the 32 teeth, the tooth may than be identified as a dental preparation. For instance, the dental preparation will typically be at the same location as the tooth would have been except that the dental preparation is smaller and narrower and has gaps with no contact point to other surrounding teeth. At the end of the training, the AI model is able to recognize and classify teeth at their position, missing teeth and preparations.

The generalization error may be defined as the distance between the predicted classification and the classification provided by the labeler. For example, suppose that the labeler has labeled a certain tooth of a data point as being a 27 tooth. This information could be written in form of a vector $\vec{v}$ of 34 components representing the 34 classes discussed above. In this case, each component of the vector is 0 except for the component related to the position 27 which will be 1 for example (i.e., $\vec{v}=[0 \ldots 0 \; 1 \; 0 \ldots 0]$). The AI model produces an answer to the classification task in form of a vector of 34 components $\vec{w}=[w_1 \ldots w_{34}]$ each component representing a probability. The class related to the component having the highest value may be identified as the predicted class of the AI model for the data point. The generalization error may be defined as the mean distance between the label $\vec{v}$ and the answer $\vec{w}$ of the AI model.

The discussion held in the first set of embodiments regarding generalization error, quality metrics, exit parameters and exit conditions still applies in the second set of embodiments.

Teeth Atlases may be used as part of the training dataset used to train the AI model to recognize and classify teeth at their respective positions.

Figure 5:
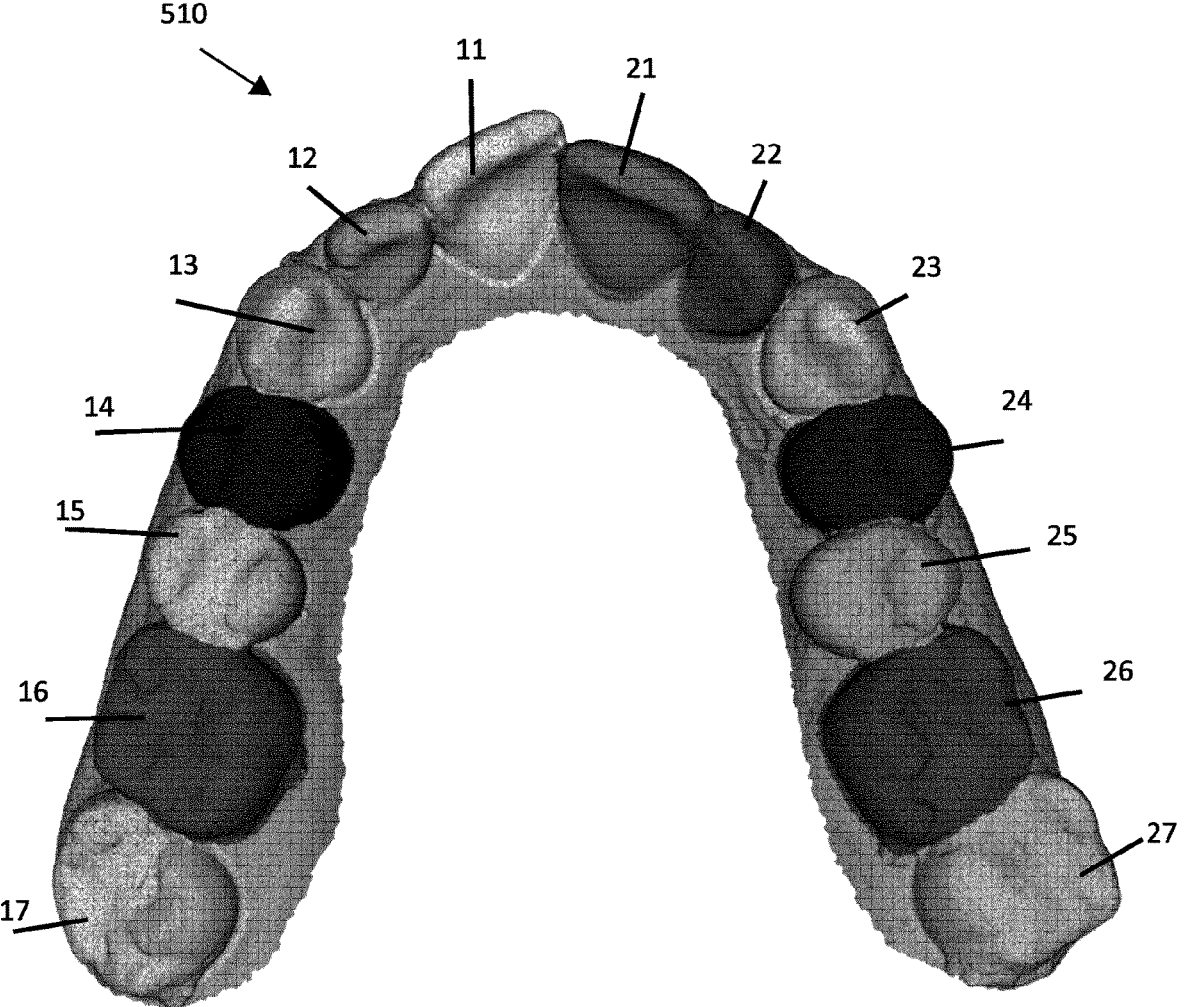
FIG. 5 is a perspective view of an exemplary segmented and labelled upper arch in accordance with the teachings of the present invention.

FIG. 5 shows an exemplary segmented and labelled 510 upper arch in accordance with the teachings of the present invention. The example of FIG. 5 shows that the AI model has recognized teeth, gingiva and the teeth gingiva boundary as only teeth are brought out. In FIG. 5, all teeth have been segmented and each of the 16 teeth of the upper arch is brought-out using a distinct color. At this point, the AI model is able to recognize teeth, gingiva and the teeth gingiva boundary. Additionally, the AI model is able to distinguish teeth types, teeth names, teeth based on their position, etc. For example, the AI model is able to differentiate the teeth in positions 26 and 17, as noted on FIG. 5. In the segmented and labelled example of FIG. 5, the AI model colours each teeth with a different colour taking into account the predicted class to which it belongs. In the depicted example, for unavoidable practical reasons, the different colors are presented as different shades of gray.

Figure 6:
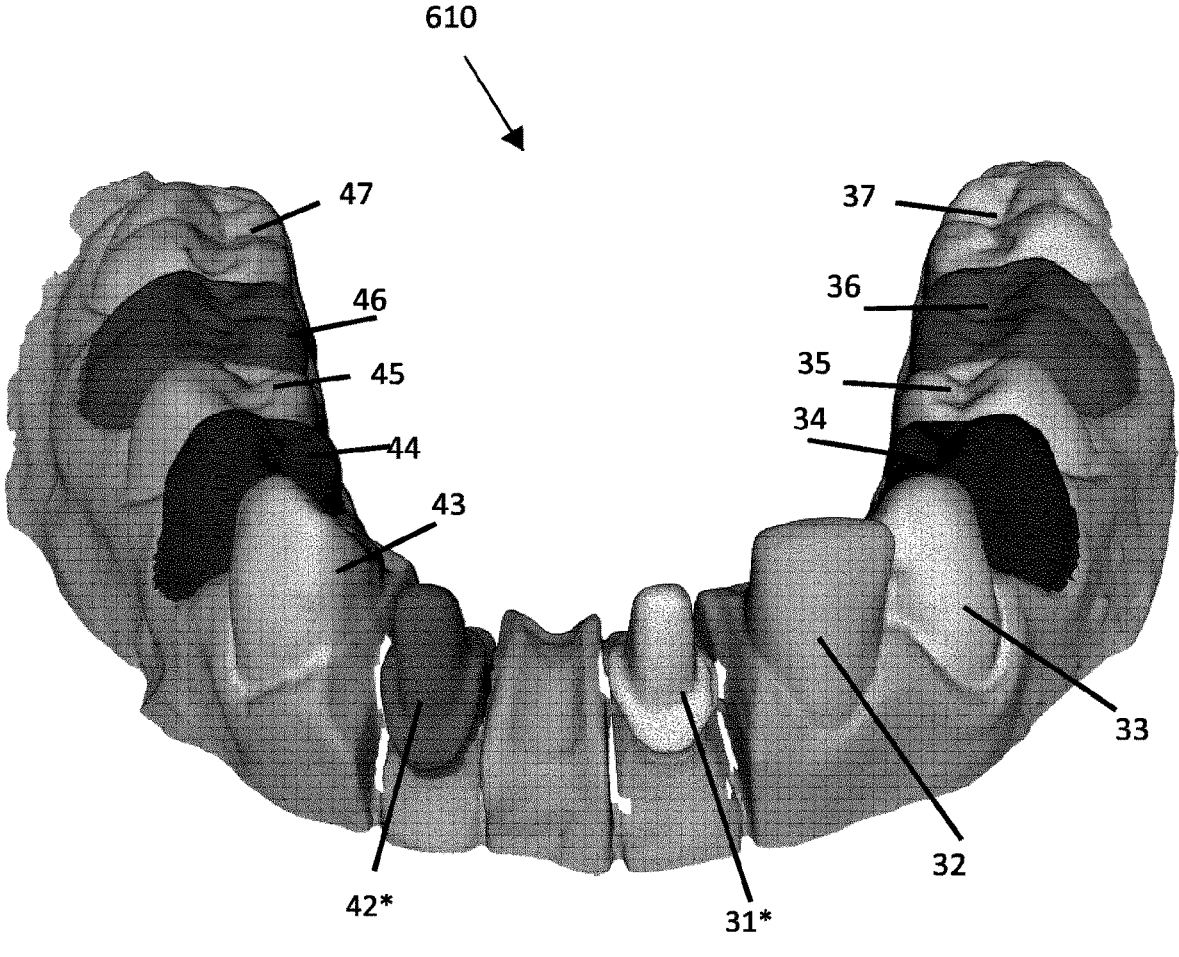
FIG. 6 is a perspective view of an exemplary segmented and labelled upper arch in accordance with the teachings of the present invention.

FIG. 6 shows an exemplary segmented and labelled 610 lower arch in accordance with the teachings of the present invention. The example of FIG. 6 shows that the AI model has recognized teeth, gingiva and the teeth gingiva boundary as only teeth of the upper arch are brought out. Additionally, the AI model is able to distinguish teeth types, teeth names, teeth based on their position, etc. More importantly, the example of FIG. 6 shows that the AI model has detected the preparations (42* and 31*) present in the digital 3D representation of a mouth.

At this point, the AI model of the first set of embodiments is able to segment a 3D mouth into several regions including a teeth region that is segmented into a plurality of sections. Preferably, the teeth section is segmented into 32 sections representing the 32 teeth of a mouth. Additionally, the AI model discussed in the second set of embodiments is able to recognize each teeth of the mouth based on its characteristics and consequently to detect a dental preparation.

The AI model discussed in accordance with the first set of embodiments may be used to further train the AI model of the second set of embodiments. Indeed, the AI model may be used to produce the data points of the training set and the test set of the second set of embodiments. A person skilled in the art would recognize that the performances of the AI models are greatly affected by the size of the training set and the testing set. Thus, the AI model of the first set of embodiments may be used to further improve the quality of the second set of embodiments.

In accordance with a third set of embodiments, a method for producing an AI model for generating dental preparations is provided. The AI models are the result of applying learning algorithms on a training dataset. The training set contains data points being digital 3D mouths for which boundaries and preparations are provided. The task that the learning algorithm has to perform is generating tooth preparations.

Figure 7:
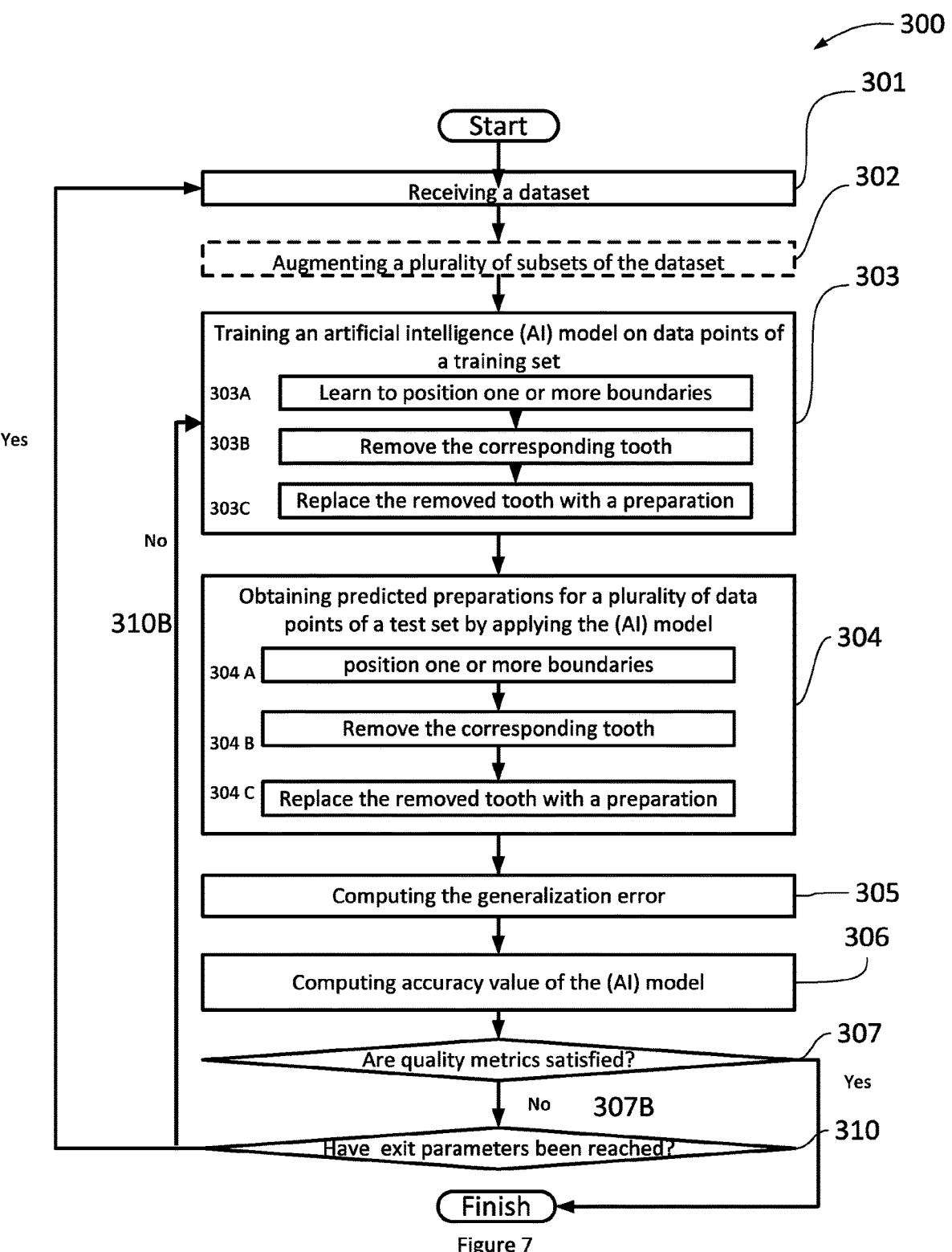
FIG. 7 is a flow chart of an exemplary method for producing an AI model for generating dental preparations in accordance with the teachings of a third set of embodiments of the present invention.

FIG. 7 shows a flow chart of an exemplary method 300 for training an Artificial Intelligence AI model for generating tooth preparations. The method 300 comprises receiving 301 a dataset comprising a training set and a test set. The training set comprises for each data point, one or more boundaries and preparations. The dataset may optionally be augmented 302. An artificial intelligence AI model is trained 303 using a plurality of data points of the training set. The training of the AI model includes learning 303A to position one or more boundaries on one more teeth of each digital 3D mouth. The training of the AI model also includes for each boundary, removing 303B the corresponding tooth and replacing 303C the corresponding tooth with a new preparation. The method 300 also includes obtaining 304 predicted preparations for a plurality of data points of a test set by applying the AI model. Step 304 in which the AI model produces predicted preparations includes positioning 304A one or more boundaries on one more teeth of each digital 3D representation of a mouth and for each boundary, removing 304B the corresponding tooth and replacing 304C the corresponding tooth with a new preparation. The new preparation may be chosen from an atlas of existing preparations. The generalization error is afterwards computed 305 for each data point. The method 300 additionally computes 306 accuracy value of the AI model. If quality metrics 307 are not satisfied 307B, the method 300 then checks 310 if exit parameters have been reached. In the case where exit parameters have not been reached 310B, the method 300 goes back to step 303. Otherwise, the method 300 goes back to receiving 301 a labeled subset of the dataset. The method 300 is repeated continuously until quality metrics are satisfied.

The boundary that the learning algorithm is asked to position may relate to a margin line, a tooth gingiva boundary, etc. The margin line is the interface between the dental preparation and the restoration. It represents where the preparation finishes and the crown begins.

In some embodiments, a dental professional may perform validation of margin lines generated by the AI model.

The generalization error may be defined for each data point as the distance between the initial boundary of the data point and the predicted boundary.

The discussion held in the first set of embodiments regarding generalization error, quality metrics, exit parameters and exit conditions still applies in the third set of embodiments.

Figure 8:
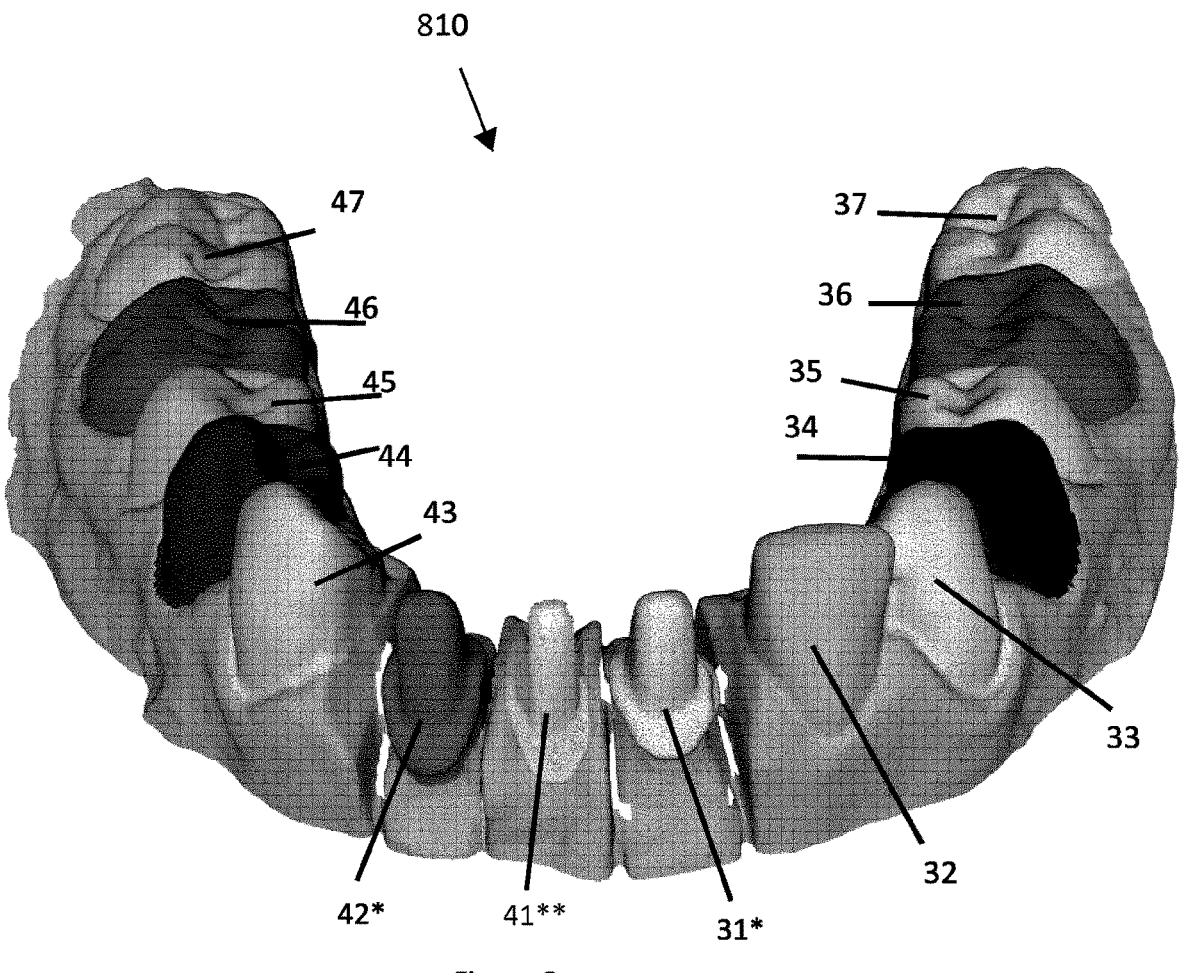
FIG. 8 is a perspective view of an exemplary dental preparations generation in accordance with the teachings of the present invention.

FIG. 8 shows an exemplary dental preparations generation 810 in accordance with the teachings of the present invention. The example of FIG. 8 shows that the AI model has positioned boundaries on two teeth of an arch. Additionally, the AI model has removed the original teeth (e.g., 41 not shown) and replaced them with dental preparations (e.g., 41**).

In some embodiments, the AI model performing preparation generation may be used to augment the datasets used in the first and second embodiments. Indeed, the AI model performing preparation generation may remove teeth from arches of the digital 3D mouths of the dataset and replace the removed teeth with realistic preparations (e.g., 41**). Consequently, this augmented data may be used to further train the AI model performing segmentation as described in the first set of embodiments. The augmented data may also be used to further train the AI model performing preparation detection.

In some embodiments, the AI model performing preparation generation may randomly remove teeth from arches of the digital 3D mouths of the dataset and replace the removed teeth with realistic preparations.

In other embodiments, the tooth removed from the digital mouth may be selected for improving quality of the AI model. For example, the AI model of the second set of embodiments may have a non-satisfied quality metric associated to detecting the preparations at a position associated with a certain tooth number (e.g., tooth number 17). The AI model may than decide to focus on removing the teeth associated to tooth number (e.g., tooth number 17) from the digital 3D mouths and replace them with generations in order to further train the AI model on detecting these generations (e.g., tooth 17).

In accordance with a fourth set of embodiments, a method for producing an AI model for generating crowns for teeth replacement is provided. The AI models are the result of applying learning algorithms on a training dataset. The training set contains data points being digital 3D mouths for which one or more teeth are missing (e.g., 42*, 31*, 41**). The task that the learning algorithm has to perform is generating crowns for teeth replacement. The production of the AI model for generating crowns for teeth replacement is divided into two blocks in the present disclosure for the sake of clarity. The first block is for generating crowns from teeth models for missing teeth. The second block is for further training the AI model by comparing the predicted crowns to natural teeth.

Figure 9A:
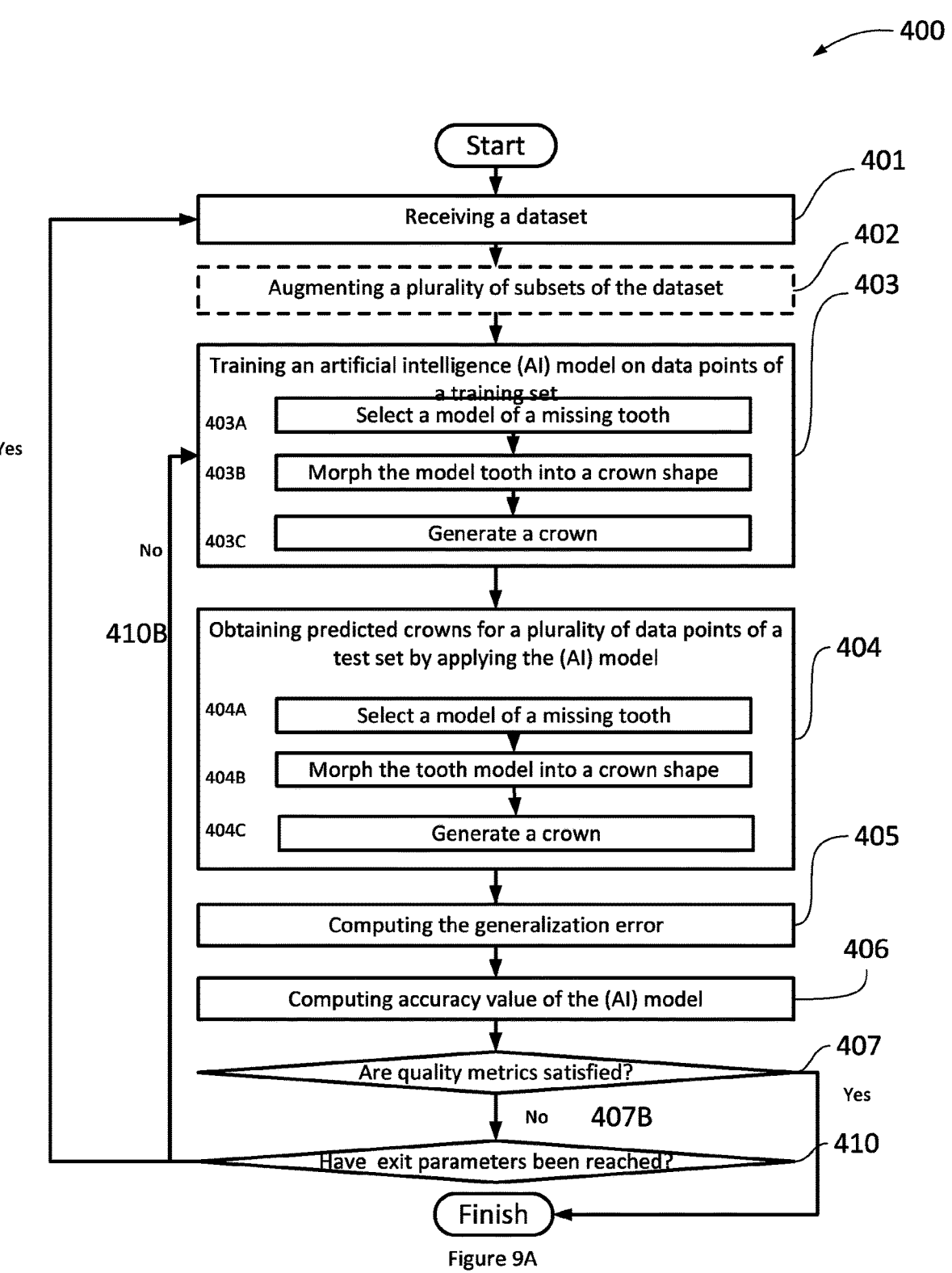

FIG. 9A shows a flow chart of an exemplary method 400 for training an Artificial Intelligence AI model for generating crowns based on teeth models for teeth replacement. The method 400 comprises receiving 401 a dataset comprising a training set and a test set. The dataset comprises digital 3D mouths for which one or more teeth are missing. Teeth atlases may also be considered as a part of the dataset. The dataset may optionally be augmented 402. An artificial intelligence AI model is trained 403 using a plurality of data points of the training set. The training of the AI model includes selecting 403A an appropriate model of the missing tooth in the digital 3D mouth. The appropriate model of the missing tooth may be selected from teeth Atlases. The training of the AI model also includes for each selected tooth model, morphing 403B the tooth model into a crown shape and generating 403C the crown shape that will be used to generate the replacement tooth. The method 400 also includes obtaining 404 predicted crowns for teeth replacement for a plurality of data points of a test set by applying the AI model. Step 404 in which the AI model produces predicted crowns includes selecting 404A an appropriate model of the missing tooth in the digital 3D representation of a mouth and morphing 404B the tooth model into a crown shape and generating 404C the crown shape that will be used to generate the replacement tooth. The tooth model may be chosen from a tooth atlas. The generalization error is afterwards computed 405 for each data point. The method 400 additionally computes 406 accuracy value of the AI model. If quality metrics 407 are not satisfied 407B, the method 400 then checks 410 if exit parameters have been reached. In the case where exit parameters have not been reached 410B, the method 400 goes back to step 403. Otherwise, the method 400 goes back to receiving 401 a labeled subset of the dataset. The method 400 is repeated continuously until quality metrics are satisfied.

Selection of the appropriate tooth model (e.g., 403A and 404A) may be based on the specific position of the missing tooth or the dental preparation.

During the steps where teeth models are morphed into crown shapes (e.g., 403B and 404B) the resulting crown shapes should preferably fill the gap between the preparations and adjacent and opposing teeth.

During the steps where crowns are generated for the missing teeth (e.g., 403C and 404C) the resulting crowns should preferably have optimal filling and occlusion.

The quality metrics and the exit parameters discussed above may still be applied in the present embodiment.

FIG. 9B shows a method 500 for further training the AI model for producing crowns for teeth generation. The method 500 may be performed subsequently to method 400. The method 500 comprises receiving 501 a dataset comprising a training set and a test set. Method 500 is performed on a dataset containing a plurality of digital 3D mouths. For each digital 3D mouth, one or more original teeth have been removed. The removed teeth are stored in the dataset. The dataset also comprises the constraints data related to occlusion from the tooth on the opposing arch for each removed tooth. Teeth atlases may also be considered as a part of the dataset. The dataset may optionally be augmented 502. The AI model of method 400 is further trained for generating 503C crowns to be used to generate the replacement tooth. The method 500 also includes obtaining 504 predicted crowns for teeth replacement for a plurality of data points of a test set by applying the AI model. In step 505 a distance measure is computed for each predicted crown. If quality metrics 507 are not satisfied 507B, the method 500 then checks 510 if exit parameters have been reached. In the case where exit parameters have not been reached 510B, the method 500 goes back to step 503. Otherwise, the method 500 goes back to receiving 501 subset of the dataset. The method 500 is repeated continuously until quality metrics are satisfied.

The distance measure computed at step 505 represents the difference between the predicted crown and the original tooth that have been removed from the digital 3D representation of a mouth for training purposes. A person skilled in the art would already recognize that the distance measure between two 3D surfaces may be defined in a plurality of ways depending on the topological space to which the surfaces belong.

Quality metrics are defined depending on the segmentation task and present exit conditions of the loop of method 500. A quality metric may be related to the distance measure defined as the distance between the predicted crown and the original tooth. The quality metrics may refer to an average distance measure between successive iterations. Another way of setting the quality metric is by defining a maximum distance measure that is tolerated in such a way that the AI model will continue training as long as the distance measure is higher than the maximum tolerated value.

Quality metrics may also relate to mechanical and physiological constraints that needs to be taken into account in replacement tooth generation. Examples of mechanical and physiological constraints may include occlusion. For instance, the proper finishing of a crown will require the tooth to have proper occlusion. In order to address the constraints related to occlusion the data from the tooth on the opposing arch is required for each tooth.

In some embodiments, the quality metric may be a combination of a plurality of quality metrics. A person skilled in the art would already recognize that the ways of setting the quality metrics do not affect the teachings of the present invention.

Exit parameters may be seen as the number of iterations during which the learning algorithm is allowed to continue training before receiving a new subset of the training set. An exit parameter may simply refer to a number of training iterations to be performed on a training set before receiving a new-segmented subset even though quality metrics are not satisfied. Another exit parameter may be the distance measure drop. The distance measure drop may represent the variation of the distance measure between successive iterations. In this way, the AI model continues training as long as the distance measure diminishes by a certain rate (e.g., 0.015).

The number of iterations to be performed before stopping the training may depend on the volume of the dataset. A person skilled in the art will recognize that the ways of setting exit parameters do not affect the teachings of the present invention.

In some embodiments, the AI model performing preparation generation described in the third set of embodiments may randomly remove teeth from arches of the digital 3D mouths of the dataset and replace the removed teeth with realistic preparations. The resulting dataset may be used to train the AI model of the fourth set of embodiments.

In other embodiments, the AI model of the third set of embodiments removes one or more selected teeth from the digital mouth for improving quality of the AI model. For example, the AI model of the fourth set of embodiments may have a non-satisfied quality metric associated to generation of crowns of some tooth associated with a tooth number (e.g., tooth number 17). The AI model of the third set of embodiments may than be configured to focus on removing the teeth associated to tooth number (e.g., tooth number 17) from the digital 3D mouths in order provide the necessary training set to further train the AI model of the fourth set of embodiments on generating these teeth (e.g., tooth 17).

The processor module 2160 may represent a single processor with one or more processor cores or an array of processors, each comprising one or more processor cores. The memory module 2160 may comprise various types of memory (different standardized or kinds of Random Access Memory (RAM) modules, memory cards, Read-Only Memory (ROM) modules, programmable ROM, etc.). The storage devices module 2300 may represent one or more logical or physical as well as local or remote hard disk drive (HDD) (or an array thereof). The storage devices module 2300 may further represent a local or remote database made accessible to the network by a standardized or proprietary interface. The variants of processor module 2120, memory module 2160, and storage devices module 2300 usable in the context of the present invention will be readily apparent to persons skilled in the art. Likewise, even though explicit mentions of the memory module 2160 and/or the processor module 2120 are not made throughout the description of the present examples, persons skilled in the art will readily recognize that such modules are used in conjunction with other modules to perform routine as well as innovative steps related to the present invention.

Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on the link between. Likewise, any number of routers (not shown) may be present and part of the link, which may further pass through the Internet.

The present invention is not affected by the way the different modules exchange information between them. For instance, the memory module and the processor module could be connected by a parallel bus 2180, but could also be connected by a serial connection or involve an intermediate module (not shown) without affecting the teachings of the present invention.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

The invention claimed is:

1. A method for generating a three-dimensional crown surface for replacing a missing tooth; the method comprising:

detecting the missing tooth from a digital three-dimensional representation of a mouth;

selecting a tooth model of the missing tooth; and morphing the tooth model into a crown shape using the digital three-dimensional representation of the mouth and an artificial intelligence model, thereby generating the three-dimensional crown surface;

wherein morphing the tooth model is performed taking into account one or more of a dental preparation, margin line, occlusion, a gap between the dental preparation and adjacent and opposing teeth;

wherein the artificial intelligence model is trained by:

receiving a first dataset comprising digital three-dimensional representations of mouths in which a three-dimensional-represented tooth is missing and is partially replaced with a three-dimensional-represented dental preparation; and repeating for each of the digital three-dimensional representations of mouths of the first dataset;

positioning one or more boundaries on one or more teeth;

for each boundary, removing a corresponding tooth; and for each boundary, replacing the corresponding tooth with a new dental preparation;

until quality metrics are satisfied and exit parameters are reached.

2. The method of claim 1 wherein training of the artificial intelligence model further comprises:

receiving a second dataset comprising additional digital three-dimensional representations of mouths in which at least one three-dimensional surface representing a validation tooth has been removed, the removed validation teeth being a distinct part of the second dataset; and repeating for each of the additional digital three-dimensional representation of mouths of the second dataset:

generating a three-dimensional validation surface representing a predicted crown for each removed validation tooth; and for each removed validation tooth, computing a validation distance measure between the three-dimensional validation surfaces representing the predicted crown and the removed validation tooth;

until validation quality metrics are satisfied and validation exit parameters are reached.

3. The method of claim 2 wherein the validation distance measure is considered satisfied when the predicted crown is visibly indistinguishable from the validation tooth.

4. The method of claim 2 wherein the training dental preparation is detected using a supplemental artificial intelligence model.

5. The method of claim 4 wherein the supplemental artificial intelligence model is trained on a third dataset comprising digital three-dimensional representations of detection mouths in which a detection tooth is missing and is partially replaced with a detection tooth preparation, according to a process comprising:

repeating for each of the digital three-dimensional representations of detection mouths of the third dataset:

labeling each tooth of the three-dimensional representations of the mouths; and detecting dental preparations;

until detection quality metrics are satisfied and detection exit parameters are reached.

6. The method of claim 5 wherein labeling each tooth of the three-dimensional representations of the mouths is performed taking into account geometric characteristics of a teeth bone comprising one or more of a gap volume surrounding each tooth bone, occlusion, and asperities.

7. The method of claim 1, wherein the tooth model of the missing tooth is selected from a teeth atlas.

8. A method for training an artificial intelligence model for generating dental preparations, the method comprising:

receiving a first dataset comprising digital three-dimensional representations of mouths in which a tooth is missing and is partially replaced with a dental preparation; and repeating for each of the digital three-dimensional representations of mouths of the first dataset:

positioning one or more boundaries on one or more teeth;

for each boundary, removing a corresponding tooth; and for each boundary, replacing the corresponding tooth with a new dental preparation;

until quality metrics are satisfied and exit parameters are reached.

9. The method of claim 8 wherein the one or more boundaries comprise a margin line.

10. The method of claim 8 wherein the new dental preparation is chosen from an atlas of existing dental preparations.

11. A crown generation system configured for generating a three-dimensional crown surface for replacing a missing tooth using an artificial intelligence model; the system comprising:

a storage module for storing digital three-dimensional representation of mouths;

a processor module having an artificial intelligence model configured to:

for each of the digital three-dimensional representations of mouths, detect the missing tooth;

select a tooth model of the missing tooth; and morph the tooth model into a crown shape using the digital three-dimensional representation of the mouth and the artificial intelligence model, thereby generating the three-dimensional crown surface; and wherein morphing the tooth model is performed taking into account one or more of a dental preparation, margin line, occlusion, a gap between the dental preparation and adjacent and opposing teeth; and a memory module for storing the three-dimensional crown surface;

wherein the artificial intelligence model is trained by:

receiving a first dataset comprising digital three-dimensional representations of mouths in which a three-dimensional-represented tooth is missing and is partially replaced with a three-dimensional-represented dental preparation; and repeating for each of the digital three-dimensional representations of mouths of the first dataset;

positioning one or more boundaries on one or more teeth;

for each boundary, removing a corresponding tooth; and for each boundary, replacing the corresponding tooth with a new dental preparation;

until quality metrics are satisfied and exit parameters are reached.

* * * * *